United States Patent
DePuy et al.

(10) Patent No.: US 8,475,552 B2
(45) Date of Patent: Jul. 2, 2013

(54) SYSTEM FOR PRESSURIZING FEEDSTOCK FOR FIXED BED REACTOR

(75) Inventors: Richard Anthony DePuy, Burnt Hills, NY (US); Derek Leslie Aldred, Granada Hills, CA (US)

(73) Assignee: General Electric Company, Schenectady, NY (US)

( * ) Notice: Subject to any disclaimer, the term of this patent is extended or adjusted under 35 U.S.C. 154(b) by 286 days.

(21) Appl. No.: 12/883,161

(22) Filed: Sep. 15, 2010

(65) Prior Publication Data

US 2012/0063957 A1 Mar. 15, 2012

(51) Int. Cl.
*C01B 3/36* (2006.01)
(52) U.S. Cl.
USPC .................. 48/197 R; 422/106; 422/232
(58) Field of Classification Search
None
See application file for complete search history.

(56) References Cited

U.S. PATENT DOCUMENTS

| | | | |
|---|---|---|---|
| 3,870,480 A * | 3/1975 | Moss | 48/71 |
| 4,138,224 A | 2/1979 | Gorin | |
| 4,278,447 A | 7/1981 | Dudt | |
| 4,290,780 A | 9/1981 | Dudt | |
| 4,405,340 A | 9/1983 | Kupfer et al. | |
| 4,426,810 A | 1/1984 | Rudolph et al. | |
| 4,516,674 A | 5/1985 | Firth | |
| 4,601,730 A | 7/1986 | McGowan et al. | |
| 4,929,254 A | 5/1990 | Kooiman et al. | |
| 4,988,239 A | 1/1991 | Firth | |
| 5,028,241 A | 7/1991 | Kooiman et al. | |
| 5,051,041 A | 9/1991 | Firth | |
| 5,139,535 A | 8/1992 | Strickland et al. | |
| 5,223,199 A | 6/1993 | Ponzielli | |
| 5,356,280 A | 10/1994 | Ponzielli | |
| 5,485,909 A | 1/1996 | Hay | |
| 5,497,873 A | 3/1996 | Hay | |
| 5,551,553 A | 9/1996 | Hay | |
| 6,112,677 A | 9/2000 | Kuntschar et al. | |
| 6,213,289 B1 | 4/2001 | Hay et al. | |
| 2008/0086945 A1 | 4/2008 | Wunning | |
| 2008/0145156 A1 | 6/2008 | Livingood et al. | |
| 2009/0202717 A1 | 8/2009 | Morra et al. | |
| 2010/0115961 A1 | 5/2010 | Chapman et al. | |
| 2010/0132633 A1 | 6/2010 | Liu et al. | |
| 2011/0253510 A1 * | 10/2011 | Fang et al. | 198/658 |

FOREIGN PATENT DOCUMENTS

| | | |
|---|---|---|
| CA | 2609977 | 12/2006 |
| CN | 11440308 | 5/2009 |
| DE | 102004030368 | 1/2006 |
| EP | 0029795 | 12/1983 |

(Continued)

OTHER PUBLICATIONS

EP Search Report and Opinion dated Dec. 28, 2011 from corresponding Application No. EP 11179580.3.

*Primary Examiner* — Imran Akram
(74) *Attorney, Agent, or Firm* — Fletcher Yoder, P.C.

(57) ABSTRACT

In accordance with one embodiment, a system includes a posimetric pump configured to increase pressure of a feedstock to provide a pressurized feedstock. The system also includes a fixed bed gasifier configured to gasify the pressurized feedstock, wherein the fixed bed gasifier comprises an enclosure, a feedstock inlet configured to receive the pressurized feedstock, at least one agent inlet configured to receive at least one gasification agent, a syngas outlet configured to output a syngas, an ash outlet configured to output ash, and a fixed bed configured to support the pressurized feedstock while allowing flow of the at least one gasification agent through the pressurized feedstock.

20 Claims, 6 Drawing Sheets

FOREIGN PATENT DOCUMENTS

| | | |
|---|---|---|
| EP | 1888718 | 2/2008 |
| EP | 2078742 | 7/2009 |
| WO | 9909115 A1 | 2/1999 |
| WO | 2006131281 | 12/2006 |
| WO | 2009055829 A1 | 4/2009 |

* cited by examiner

SYSTEM FOR PRESSURIZING FEEDSTOCK FOR FIXED BED REACTOR

BACKGROUND OF THE INVENTION

The subject matter disclosed herein relates to a system for pressurizing and delivering solid feedstock (e.g., biomass) to a fixed bed reactor.

A typical, small scale (e.g., 10-30 MW) fixed bed reactor (e.g., fixed bed gasifier) is capable of generating energy from various solid feedstock (e.g., biomass). The fixed bed reactor may convert the solid feedstock into a combustible gas (i.e., syngas) by reaction with oxidant (air, enriched air, or oxygen), steam, or a combination thereof. This combustible gas may be used in a variety of applications such as for chemical production or in a combustion engine for use in the generation of electricity. Alternatively, the fixed bed reactor may use the solid feedstock to generate steam for use in a steam turbine for use in the generation of electricity. However, use of biomass as the feedstock limits the scale of these fixed bed reactors. In addition, the fixed bed reactors operate at near atmospheric pressure limiting the production capacity of the reactors.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a posimetric pump configured to increase pressure of a feedstock to provide a pressurized feedstock. The system also includes a fixed bed gasifier configured to gasify the pressurized feedstock, wherein the fixed bed gasifier comprises an enclosure, a feedstock inlet configured to receive the pressurized feedstock, at least one agent inlet configured to receive at least one gasification agent, a syngas outlet configured to output a syngas, an ash outlet configured to output ash, and a fixed bed configured to support the pressurized feedstock while allowing flow of the at least one gasification agent through the pressurized feedstock.

In accordance with a second embodiment, a system includes a posimetric pump configured to increase pressure of a feedstock and a feeder configured to meter the feedstock from the posimetric pump. The system also includes a fixed bed reactor configured to react at least one agent with the feedstock from the feeder at an elevated pressure provided by the posimetric pump. The fixed bed reactor includes a fixed bed configured to support the feedstock while allowing flow of the at least one agent through the feedstock.

In accordance with a third embodiment, a system includes a posimetric pump configured to increase pressure of a feedstock and a heater configured to heat the feedstock to control a moisture content of the feedstock. The system also includes a fixed bed reactor configured to react at least one agent with the feedstock at an elevated pressure provided by the posimetric pump. The fixed bed reactor includes a fixed bed configured to support the feedstock while allowing flow of the at least one agent through the feedstock.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to a system for pressurizing feedstock for fixed bed reactors (e.g., fixed bed gasifiers) to improve the production capacity of the reactors. Fixed bed reactors operate to convert solid feedstock, such as biomass, into combustible gas (e.g., syngas). Biomass may include wood chips, rice hulls, corn stalks, municipal solid waste, industrial waste, and other types of waste. The fixed bed reactors operate on a smaller scale (e.g., 10-30 MW) when using biomass as the feedstock due to limitations in supplying biomass to a reactor site. Also, the fixed bed reactors operate at near atmospheric pressure limiting the capacity to generate syngas from the biomass.

Embodiments of the present disclosure provide a posimetric pump to pressurize the feedstock and to increase the production capacity of the fixed bed reactors. For example, the posimetric pump increases the pressure of the feedstock provided to the fixed bed reactor (e.g., fixed bed gasifier), increasing the pressure in the reactor volume and the production of syngas from the volume. In some embodiments, the pressurized feedstock may be directly metered to the fixed bed reactor from the posimetric pump. In other embodiments, the pressurized feedstock may be metered to the fixed bed reactor via a feeder provided between the posimetric pump and the fixed bed reactor. Control of performance in the fixed bed reactor may also occur via control of the content of the pressurized feedstock provided to the fixed bed reactor. In certain embodiments, multiple posimetric pumps may be used to provide multiple feedstocks simultaneously to the fixed bed reactor. In other embodiments, a single posimetric pump may be used to provide a mixture of multiple feedstocks.

Biomass used as the feedstock introduces additional variables into the performance of the fixed bed reactor. For example, biomass varies in moisture content. Thus, various embodiments may be provided to control the moisture content of the biomass. For example, certain embodiments may include a heater or heat exchanger to control the moisture content of the feedstock. In some embodiments, a controller may be provided to control various aspects of the system such as conveyance of multiple feedstocks, the heater, or the heat exchanger to control the performance in the gasifier.

Figure 1:
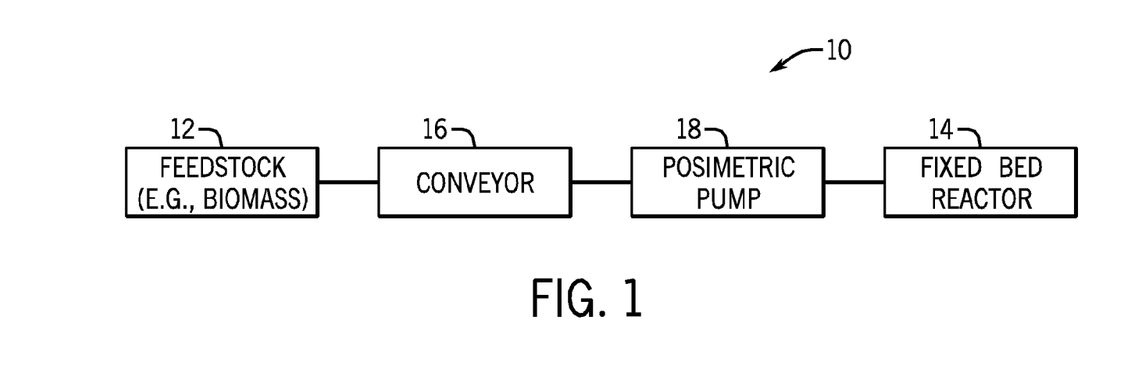
FIG. 1 is a schematic diagram of an embodiment of a system for pressurizing a fuel feedstock for a fixed bed reactor.

FIG. 1 is a schematic diagram of an embodiment of a system 10 for pressurizing a fuel feedstock 12 for a fixed bed reactor 14 (e.g., fixed bed gasifier) to increase the production of the fixed bed reactor 14. The illustrated system 10 includes feedstock 12, a conveyor 16, a posimetric pump 18, and the fixed bed reactor 14. The feedstock 12 may include biomass. Biomass is biological material derived from living or recently living organisms. For example, the biomass feedstock 12 may include wood chips, rice hulls, corn stalks, or other agricultural waste. Also, biomass feedstock 12 may include biodegradable wastes from municipal solid wastes or industrial wastes.

The feedstock 12 is placed on the conveyor 16 and transferred to the posimetric pump 18. Prior to the posimetric pump 18, the feedstock 12 may be passed to a feedstock preparation unit for pretreatment. The feedstock preparation unit may, for example, resize or reshape the feedstock 12 by chopping, milling, shredding, pulverizing, briquetting, or pelletizing the feedstock 12. The posimetric pump 18 is configured to pressurize the received feedstock 12. In certain embodiments, the posimetric pump 18 also meters the feedstock 12. Accordingly, the term "posimetric" may be defined as capable of metering (e.g., measuring an amount of) and positively displacing (e.g., trapping and forcing displacement of) a substance being delivered by the pump 18. As the feedstock 12 is fed through an opening of an inlet at atmospheric or low pressure, the posimetric pump 18 imparts a tangential force or thrust to the feedstock 12 in a rotational direction of a rotor or spool. The direction of flow of the feedstock 12 is from the inlet to an outlet. As the feedstock 12 rotates through a curved passage in the posimetric pump 18, the feedstock 12 encounters an abutment disposed adjacent the outlet extending across the curved passage. The feedstock 12 is diverted by the abutment through an opening of the outlet at a higher pressure. Within the curved passage the feedstock 12 becomes locked-up, forming a lock-up region, and flows at a constant rate out of a discharge of the outlet. Thus, the posimetric pump 18 is designed to displace a defined volume of substance from a region of low pressure to a region of higher pressure, while pressurizing the feedstock 12. For example, the posimetric pump 18 is configured to increase the pressure of biomass. Furthermore, the lock-up region may block gas flow from the reactor 14 in an upstream direction through the posimetric pump 18.

The pressurized feedstock 12 may be directly transferred from the posimetric pump 18 to the fixed bed reactor 14. In certain embodiments, as described below, the pressurized feedstock may be transferred to the fixed bed reactor 14 via a feeder. In other embodiments, the pressurized feedstock 12 may be pneumatically conveyed to the fixed bed reactor 14 via a gas. The fixed bed reactor 14 may include a fixed bed combustor, a fixed bed gasifier, a fixed bed boiler, or any other type of fixed bed structure to receive and to derive energy from the pressurized feedstock 12. The fixed bed reactor 14 is configured to react at least one agent (e.g., air, oxygen, or steam) with the pressurized feedstock 14 (e.g., biomass), as described in greater detail below. Also, the fixed bed reactor 14 includes a fixed bed configured to support the feedstock 14, while also allowing flow of the at least one agent. In the disclosed embodiments, the posimetric pump 18 is configured to pressurize the feedstock 12 to elevate the operating pressure of the fixed bed reactor 14, rather than operating at atmospheric or near atmospheric conditions. For example, the reactor 14 may operate at about 150 psia rather than about 15 psia (i.e., near atmospheric pressure) to provide a substantial increase (e.g., 10 times) in the production capacity of the reactor 14. In certain embodiments, the production capacity of the pressurized system may be increased by approximately 2 to 5, 2 to 10, or 2 to 20 times that of a non-pressurized feedstock 12 and reactor 14.

Figure 2:
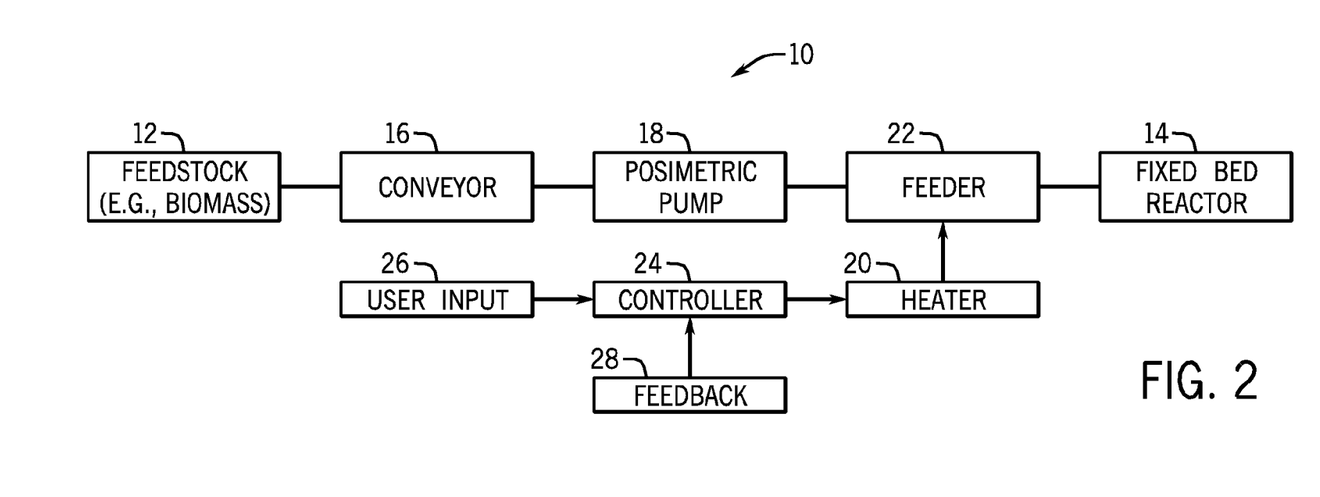
FIG. 2 is a schematic diagram of an embodiment of a system for pressurizing and heating a fuel feedstock for a fixed bed reactor.

Embodiments of systems 10 for pressurizing feedstock 12 may include additional features to control the conditions of the feedstock 12 as well as the operation of the fixed bed reactor 14. For example, FIG. 2 is a schematic diagram of an embodiment of the system 10 for pressurizing and heating a fuel feedstock 12 for the fixed bed reactor 14. The illustrated system 10 includes the feedstock 12, the conveyor 16, the posimetric pump 18, a feeder 22, a heater 20, and the fixed bed reactor 14. The system 10 operates as described above except that the feeder 22 transfers the pressurized feedstock 12 to the fixed bed reactor 14. Instead of the posimetric pump 18 metering the pressurized feedstock 12 to the fixed bed reactor 14, the feeder 22 is configured to meter the feedstock 12 (e.g., biomass) to the fixed bed reactor 14. The feeder 22 may include a screw feeder, rotary feeder, a combination thereof, or any other type of feeder 22 capable of metering the feedstock 12 from the posimetric pump 18 to the fixed bed reactor 14. As the posimetric pump 18 described above, the feeder 22 provides pressurized feedstock 12 to the fixed bed reactor 14 to allow the fixed bed reactor 14 to operate at an elevated pressure to increase the production of energy from the feedstock 12. The feeder 22 may also incorporate gas to pneumatically convey the feedstock 12. The screw feeder may accurately discharge feedstock 12 at a controlled rate using a rotating helicoid screw with agitating blades to move the feedstock 12 forward. The screw feeder may be volumetric or gravimetric. The rotary feeder includes a rotor shaft with vanes attached to the rotor to move the feedstock 12 forward. The rotary feeder may vibrate to allow for volumetric distribution.

In addition to the feeder 22, the system includes heater 20 to control the moisture content of the feedstock 12. The moisture content of the feedstock 12, particularly biomass, affects the ability of feedstock 12 to be used as a fuel in the fixed bed reactor 14. Each type of biomass has its own specific properties, such as moisture content, which determines its performance as a fuel. For example, the higher the moisture content of the biomass, the lower the heating value of the biomass. In the illustrated embodiment, the heater 20 applies heat to the feeder 22 to reduce the moisture content of the pressurized feedstock 12. In certain embodiments, the heater 20 may apply heat upstream of the posimetric pump 18 to the feedstock 12 to reduce moisture content. Water vapor generated after heating the feedstock 12 or pressurized feedstock 12 may be removed prior to the gasification of the feedstock 12. The heater 20 is coupled to a controller 24. The controller 24 is configured to adjust a heat output of the heater 20 to adjust the moisture content of the feedstock 12. The controller 24 is responsive to user input 26 as to the amount of heat output applied by the heater 20. The controller 24 is also responsive to feedback 28 from the system 10 related to the moisture content of the feedstock 12. For example, the feedback 28 may come from transducers located throughout the system 10, such as the conveyor 16, the posimetric pump 18, or the fixed bed reactor 14. The feedback 28 may also be indirectly related to the moisture content of the feedstock 12. For example, transducers may be located at the fixed bed reactor 14 to provide feedback 28 as to the performance of the reactor 14 or the heating value of the feedstock 12, which may be indirect indicators of the moisture content of the feedstock 12. The feedback 28 may include an actual measurement of moisture in the feedstock 12 or the fixed bed reactor 14. Also, the feedback 28 may include measurements of other parameters indirectly related to moisture, such as temperature, pressure, and other parameters. Like pressurizing the feedstock 12, controlling the moisture content of the feedstock 12 also increases the productive capacity of the fixed bed reactor 14.

Figure 3:
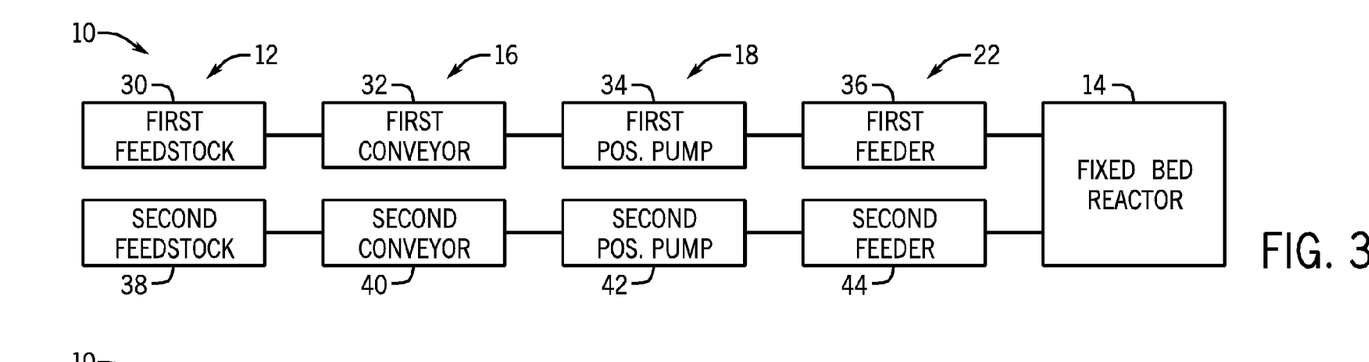
FIG. 3 is a schematic diagram of an embodiment of a system for pressurizing multiple fuel feedstocks for a fixed bed reactor.

Multiple feedstocks 12 may be transferred to control the performance of the fixed bed reactor 14, as well as the content of the energy produced from the feedstock 12. FIG. 3 is a schematic diagram of an embodiment of the system 10 for pressurizing multiple fuel feedstocks 12 for a fixed bed reactor 14. The illustrated system 10 includes a first feedstock 30, a first conveyor 32, a first posimetric pump 34, a first feeder 36, and the fixed bed reactor 14. The system 10 also includes a second feedstock 38, a second conveyor 40, a second posimetric pump 42, and a second feeder 44. The feedstocks 12, conveyors 16, posimetric pumps 18, and feeders 22 are as described above. The first posimetric pump 34 is configured to increase the pressure of the first feedstock 30 and to provide a first pressurized feedstock 30 to the fixed bed reactor 14 via the first feeder 36. The second posimetric pump 42 is configured to increase the pressure of the second feedstock 38 and to provide a second pressurized feedstock 38 to the fixed bed reactor 14 via the second feeder 44. In certain embodiments, the posimetric pumps 18 may directly meter and transfer the pressurized feedstocks 12 to the fixed bed reactor 14. Although the illustrated embodiment illustrates posimetric pumps 18 operating in parallel, in some embodiments the posimetric pumps 18 may operate in series.

As mentioned above, each type of biomass has its own specific properties. By providing two separate paths for providing feedstock 12 to the fixed bed reactor 14, the performance of the feedstocks 12, as well as the fixed bed reactor 14 may be controlled. For example, the first feedstock 30 may include one type of biomass and the second feedstock 38 may include another type of biomass. Each type of biomass may have distinct properties (e.g., moisture content or heating values). The system 10 may control a ratio of the first pressurized feedstock 30 to the second pressurized feedstock 38 provided to the fixed bed reactor 14 to affect the overall properties of the pressurized feedstock 12, e.g., overall moisture content or heating values, provided to the fixed bed reactor 14. Depending on characteristics of the first and second feedstocks 30 and 38, the system 10 may provide similar or different control of the conveyors 32 and 40, posimetric pumps 34 and 42, and feeders 36 and 44. For example, the first posimetric pump 34 may be configured to provide a first pressure of the first feedstock 30, while the second posimetric pump 42 may be configured to provide a second pressure of the second feedstock 38. The first and second pressures may be equal or may vary by approximately 5 to 100 percent or more relative to one another. The system 10 also enables independent control of the pumping and pressurization of each feedstock 30 and 38 to account for variations within each feedstock. In addition, providing different types of feedstock 12 alters any products (e.g., syngas) generated by the fixed bed reactor 14. Again, the posimetric pumps 18 provide pressurized feedstock 12 to the fixed bed reactor 14 to allow the fixed bed reactor 14 to operate at an elevated pressure to increase the production of energy from the feedstock 12.

Figure 4:
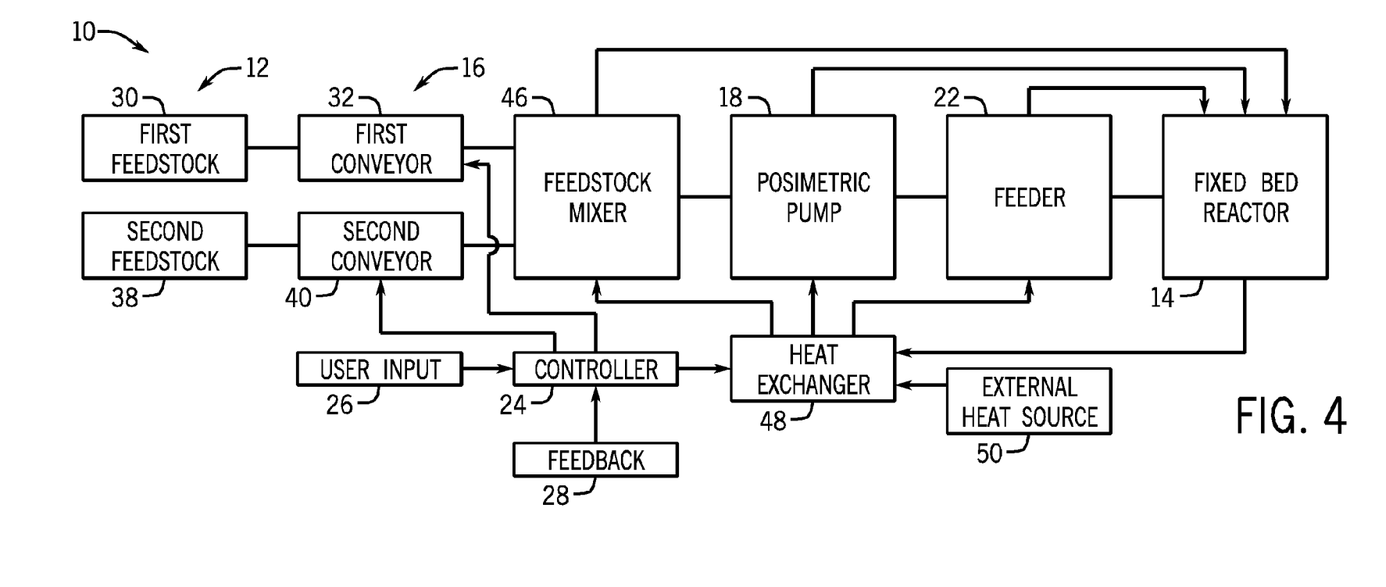
FIG. 4 is a schematic diagram of an embodiment of a system for pressurizing and heating multiple fuel feedstocks for a fixed bed reactor.

In certain embodiments, additional mechanisms may be provided to control and alter the content of the feedstock 12 provided to the fixed bed reactor 14. For example, FIG. 4 is a schematic diagram of another embodiment of the system 10 for pressurizing and heating multiple fuel feedstocks 12 for a fixed bed reactor 14. The system 10 includes first and second feedstocks 30 and 38, first and second conveyors 32 and 40, a feedstock mixer 46, posimetric pump 18, feeder 22, and fixed bed reactor 14. The first and second conveyors 32 and 40 are configured to deliver first and second feedstocks 30 and 38 to the feedstock mixer 46. In certain embodiments, the first and second conveyors 32 and 40 are configured to deliver first and second feedstocks 30 and 38 directly to the posimetric pump 18. However, the illustrated embodiment includes the mixer 46 to provide a more uniform mixture of the first and second feedstocks 30 and 38. The mixer 46 may include a housing with inlets from the conveyors 32 and 40, and a mixing mechanism to agitate, stir, or generally blend the feedstocks 30 and 38 together. The system 10 includes controller 24 to alter the ratio of the first feedstock 30 relative to the second feedstock 38, which are provided to feedstock mixer 46 and subsequently to the posimetric pump 18. The controller 24 may alter the ratio by altering the rate of conveyances of the first and second feedstocks 30 and 38 by the first and second conveyors 32 and 40. The ratio determines the heating value and moisture content of a mixture of the first and second feedstocks 30 and 38. In certain embodiments, the ratio of the first feedstock 30 relative to the second feedstock 38 may be manually controlled and/or altered. The feedstock mixture is transferred to the posimetric pump 18 for pressurization. The pressurized feedstock mixture is then provided to the feeder 22. The feeder 22 provides the pressurized feedstock 12 to the fixed bed reactor 14 to allow the fixed bed reactor 14 to operate at an elevated pressure to increase the production of energy from the feedstock 12.

The system 10 also includes a heat exchanger 48 to control the moisture content of the feedstock 12. The heat exchanger 48 may transfer heat to the feedstock mixer 46, the posimetric pump 18, the feeder 22, or any combination thereof, to reduce the moisture content of the feedstock 12. Water vapor generated after heating the feedstock 12 or pressurized feedstock 12 may be removed prior to the gasification of the feedstock 12. Heat is provided to the heat exchanger 48 via the reactor 14 and/or an external heat source 50. The heat exchanger 48 is coupled to controller 24. The heat source 50 may include steam, combustion exhaust (e.g., from a gas turbine, boiler, or furnace), heated process water, or waste heat. For example, the waste heat may be obtained from a variety of plant components, such as a gas treatment unit, a compressor, an engine, or a component of an integrated gasification combined cycle (IGCC) system. The heat exchanger 48 may exchange heat from the reactor 14 and/or the external heat source 50 directly to the feedstock mixer 46, pump 18, or feeder 22, or indirectly with a heat transfer medium. For example, the heat exchanger 48 may transfer heat to the housing of the mixer 46, pump 18, or feeder 22, or the heat exchanger 48 may flow a heated gas through the interior.

Controller 24 is configured to adjust the heat output of the heat exchanger 48 to adjust the moisture content of the feedstock 12. The controller 24 is responsive to user input 26 as to the amount of heat output applied by the heat exchanger 48. The controller 24 is also responsive to feedback 28 from the system 10 related directly or indirectly to the moisture content of the feedstock 12. For example, the feedback 28 may come from transducers located throughout the system 10, such as the feedstock mixer 46, the posimetric pump 18, the feeder 22, or the fixed bed reactor 14. For example, the feedback 28 may relate to the performance of the reactor 14 or the heating value of the feedstock 12, which may be indirect indicators of the moisture content of the feedstock 12. Also, the feedback 28 may include measurements of other parameters indirectly related to moisture, such as temperature, pressure, and other parameters. The feedback 28 may include an actual measurement of moisture in the mixture of feedstock 12 or the fixed bed reactor 14. User input 26 and feedback 28 allows the controller 24 to adjust the moisture content, as well as heating value of the mixture of feedstock 12. The controller 24 may vary the heat output at various locations of the system. In addition, the controller 24 allows the ratio of the first and second feedstocks 38 to be adjusted, as described above. As mentioned above, the ratio may be manually adjusted in certain embodiments. Adjusting the moisture content and heating value of the mixture of feedstock 12 alters the amount and content of energy generated by the fixed bed reactor 14. As mentioned above, providing pressurized feedstock 12 increases the operating pressure of the fixed bed reactor 14 increasing the production of the reactor 14.

Figures 5, 6:
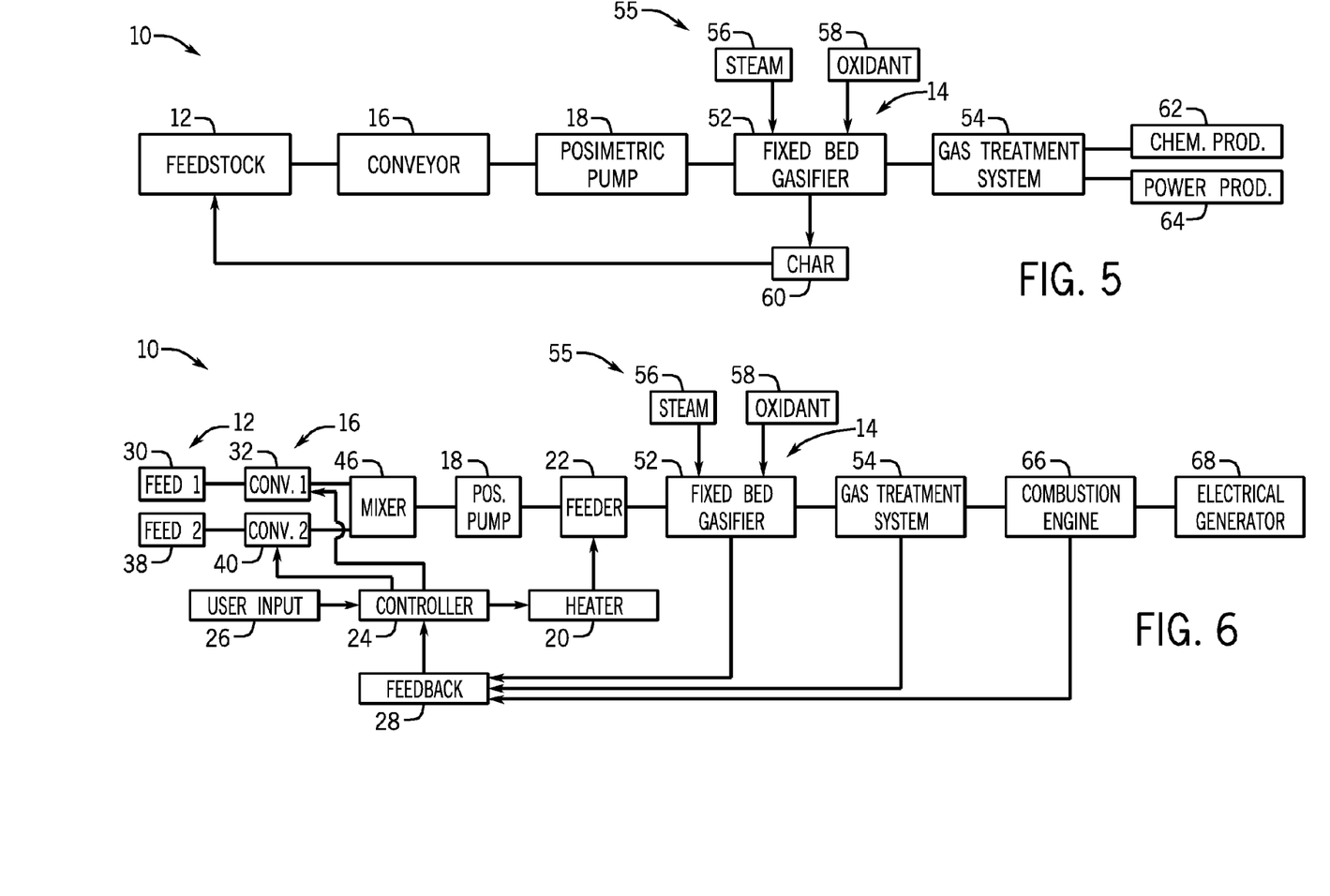
FIG. 5 is a schematic diagram of an embodiment of a system for pressurizing a fuel feedstock for a fixed bed gasifier and using the gasification product in chemical and power production.
FIG. 6 is a schematic diagram of an embodiment of a system for pressuring a mixed fuel feedstock for a fixed bed gasifier and using the gasification product in a combustion engine for generating electrical power.
Figure 7:
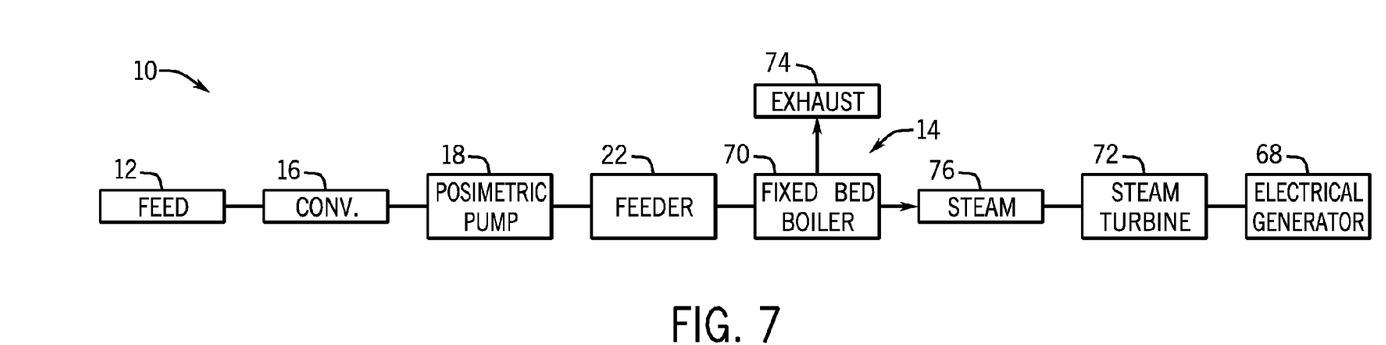
FIG. 7 is a schematic diagram of an embodiment of a system for pressurizing a fuel feedstock for a fixed bed boiler and using the steam product in a steam turbine for generating electrical power.

FIGS. 5-7 describe embodiments for various applications for products of the pressurized feedstock 12 produced in the fixed bed reactor 14. For example, FIG. 5 is a schematic diagram of an embodiment of system 10 for pressurizing fuel feedstock 12 for a fixed bed gasifier 52 and using the gasification product in chemical and power production. The system 10 includes feedstock 12 (e.g., biomass), conveyor 16, posimetric pump 18, fixed bed gasifier 52, and gas treatment system 54. As described above, the posimetric pump 18 is configured to meter and increase the pressure of the feedstock 12 to provide pressurized feedstock 12 to the fixed bed gasifier 52.

The fixed bed gasifier 52 is configured to gasify the pressurized feedstock 12. The fixed bed gasifier 52 may convert the feedstock 12 into a syngas, e.g., a combination of carbon monoxide and hydrogen. This conversion may be accomplished by subjecting the pressurized feedstock 12 to a controlled amount of at least one agent 55 (e.g., a gasification agent 55) such as steam 56 and/or oxidant 58 (air, enriched air, purified oxygen) at elevated pressures and temperatures.

The gasification process may include the pressurized feedstock 12 undergoing a pyrolysis process, whereby the pressurized feedstock 12 is heated. Temperatures inside the fixed bed gasifier 52 may vary during the pyrolysis process, depending on the type of feedstock 12. The heating of the pressurized feedstock 12 during the pyrolysis process may generate a solid, (e.g., char 60), and residue gases, (e.g., carbon monoxide, hydrogen, and nitrogen). The char 60 remaining from the feedstock 12 from the pyrolysis process may only weigh up to approximately 30% of the weight of the original feedstock 12. The char 60 may be added into the feedstock 12 upstream of the posimetric pump 18 to be reused.

A partial oxidation process may also occur in the fixed bed gasifier 52. The combustion may include introducing oxidant 58 (e.g., air, enriched air, or oxygen) to the char 60 and residue gases. The char 60 and residue gases may react with the oxygen in the oxidant 58 to form carbon dioxide and carbon monoxide, which provides heat for the gasification reactions. Steam 56 may be introduced into the fixed bed gasifier 52 during gasification. The char 60 may react with the carbon dioxide and steam 56 to produce carbon monoxide and hydrogen. In essence, the gasifier utilizes steam and oxygen from the oxidant 58 to allow some of the pressurized feedstock to be "burned" to produce carbon monoxide and release energy, which drives a second reaction that converts further feedstock 12 to hydrogen and additional carbon dioxide.

In this way, a resultant gas is manufactured by the fixed bed gasifier 52. This resultant gas may include approximately 50% of carbon monoxide and hydrogen in equal proportions, as well as $CO_2$, $CH_4$, HCl, HF, COS, $NH_3$, HCN, and $H_2S$ (based on the sulfur, chlorine, fluorine, and nitrogen content of the feedstock 12). The overall ratio and types of constituents within the resultant gas are determined by the type of feedstock 12. This resultant gas may be termed untreated, raw, or sour syngas, since it contains, for example, $H_2S$. The fixed bed gasifier 52 may also generate waste, which may be a wet ash material. This ash may be removed from the fixed bed gasifier 52 and disposed of, for example, as road base or as another building material. In some embodiments, the fixed bed gasifier 52 may also generate a dry ash material which may be removed. The gas treatment system 54 may be utilized to clean the raw syngas. The gas treatment system 54 may scrub the raw syngas to remove the HCl, HF, COS, HCN, and $H_2S$ from the raw syngas, which may include separation of sulfur in a sulfur processor by, for example, an acid gas removal process in the sulfur processor. Furthermore, the gas treatment system 54 may separate salts from the raw syngas via a water treatment unit that may utilize water purification techniques to generate usable salts from the raw syngas. Subsequently, the gas from the gas treatment system 54 may include treated, sweetened, and/or purified syngas, (e.g., the sulfur has been removed from the syngas), with trace amounts of other chemicals, e.g., $NH_3$ (ammonia) and $CH_4$ (methane).

In some embodiments, the gas treatment system 54 may include a gas processor to remove residual gas components from the treated syngas such as, ammonia and methane, as well as methanol or any residual chemicals. However, removal of residual gas components from the treated syngas is optional, since the treated syngas may be utilized as a fuel even when containing the residual gas components, e.g., tail gas. At this point, the treated syngas may include approximately 25% CO, approximately 25% $H_2$, approximately 40% $N_2$, and approximately 10% $CO_2$ and is substantially stripped of $H_2S$. In this manner, the gas treatment system 54 and/or the treated syngas may be used in chemical production 62. For example, the gas treatment system 54 and/or the treated syngas may be used to produce methanol, hydrogen, or other chemicals. The treated syngas may also be used in power production 64. For example, the syngas may be used to generate heat, mechanical power, and electrical power. In particular, a gas turbine may use the syngas to drive an electrical generator.

In the embodiment described above, the posimetric pump 18 may be configured to increase the pressure of biomass to provide pressurized biomass to the fixed bed gasifier 52, and the fixed bed gasifier 52 is configured to gasify the pressurized biomass. The posimetric pump 18 pressurizes the biomass and subsequently increases the operating pressure of the fixed bed gasifier 52 to increase the amount of syngas generated from the same reactor volume of biomass, therefore, increasing the capacity of the fixed bed gasifier 52. In certain embodiments, the operating pressure of the fixed bed gasifier 52 that receives pressurized biomass may range from approximately 30 psia to 210 psia. For example, the operating pressure of the fixed bed gasifier 52 receiving the pressurized biomass may be approximately 30, 40, 50, 70, 90, 110, 130, 150, 170, 190, or 210 psia, or any pressure therebetween. Thus, the fixed bed gasifier 52 does not operate at near atmospheric conditions.

FIG. 6 illustrates a further embodiment for use of the gasification product. FIG. 6 is a schematic diagram of an embodiment of system 10 for pressurizing a mixed fuel feedstock 12 for the fixed bed gasifier 52 that uses the gasification product in a combustion engine 66 (e.g., gas turbine engine) for generating electrical power. The system 10 includes first and second feedstocks 30 and 38, first and second conveyors 32 and 40, feedstock mixer 46, posimetric pump 18, feeder 22, fixed bed gasifier 52, and gas treatment system 54. The conveyors deliver the feedstocks 12 to the mixer 46. The mixer 46 transfers the mixture of feedstocks to the posimetric pump 18, where the posimetric pump 18 pressurizes the feedstock 12. In certain embodiments, the posimetric pump 18 may be configured to meter the mixture to the feeder 22, which transfers the mixture to the fixed bed gasifier 52. In some embodiments, the feeder 22 may be configured to meter the pressurized feedstock 12 from the posimetric pump 18 to the fixed bed gasifier 52. Again, the posimetric pump 18 elevates the pressure of the fixed bed gasifier 52 by providing the pressurized feedstock 12, thus increasing the production capacity of the fixed bed gasifier 52.

The system 10 includes controller 24 to adjust the ratio of the first feedstock 30 to the second feedstock 38, as described above. The system 10 also includes heater 20 to control the moisture content of the pressurized feedstock 12 upstream from the fixed bed gasifier 52. By further example, the heater 20 may transfer heat to the feeder 22, such that the heater 20 may control the moisture content of feedstock 12 upstream of the fixed bed gasifier 52. For example, the heater 20 may transfer heat to the mixer 46. The heater 20 is also coupled to controller 24. The controller 24 is configured to adjust the heat output of the heater 20 to adjust the moisture content of the feedstock 12. The controller 24 is responsive to user input 26 and feedback 28, as described above, to adjust the heating value and moisture content of the feedstock mixture. For example, transducers may be located in the fixed bed gasifier 52, gas treatment system 54, and/or combustion engine 66 to provide information directly or indirectly related to moisture content, as described above. In addition, the transducers may provide information related to the performance of the feedstock 12 as a fuel source.

The fixed bed gasifier 52 is configured to gasify the pressurized feedstock 12 via subjecting the pressurized feedstock 12 to a controlled amount of at least one gasification agent such as steam or oxidant at elevated pressures and temperatures, as described above. Following gasification, the raw syngas is treated by the gas treatment system 54 to produce a treated syngas. The treated syngas may then be used by the combustion engine 66 to drive an electrical generator 68 to produce electricity. For example, the engine 66 and generator 68 may be disposed in a power plant, such as an integrated gasification combined cycle (IGCC) power plant. In certain embodiments, the combustion engine 66 may include an internal combustion engine, or a compression ignition engine, or a gas turbine engine. Thus, the combustion engine 66 may be a reciprocating engine or a rotary engine.

The pressurized feedstock 12 may be used in a variety of fixed bed reactors 14 besides fixed bed gasifiers 52. For example, FIG. 7 is a schematic diagram of an embodiment of system 10 for pressurizing fuel feedstock 12 for a fixed bed boiler 70, which generates steam to drive a steam turbine 72 for generating electrical power. The system 10 includes feedstock 12, conveyor 16, posimetric pump 18, feeder 22, and fixed bed boiler 70. The feedstock 12, conveyor 16, posimetric pump 18, and feeder 22 are as described above. In the illustrated embodiment, pressurized feedstock 12 (e.g., biomass) is metered to the fixed bed boiler 70. The pressurized feedstock 12 elevates the operating pressure of the fixed bed boiler 70. The pressurized feedstock 12 is used as a fuel and reacted with at least one agent (e.g., air enriched air, or purified oxygen). Hot pressurized exhaust 74 is generated upon combustion of the pressurized feedstock 12. The heat from the exhaust 74 generates steam 76. The steam 76 may be used to the drive steam turbine 72 connected to the electrical generator 68 to produce electrical power.

Figure 8:
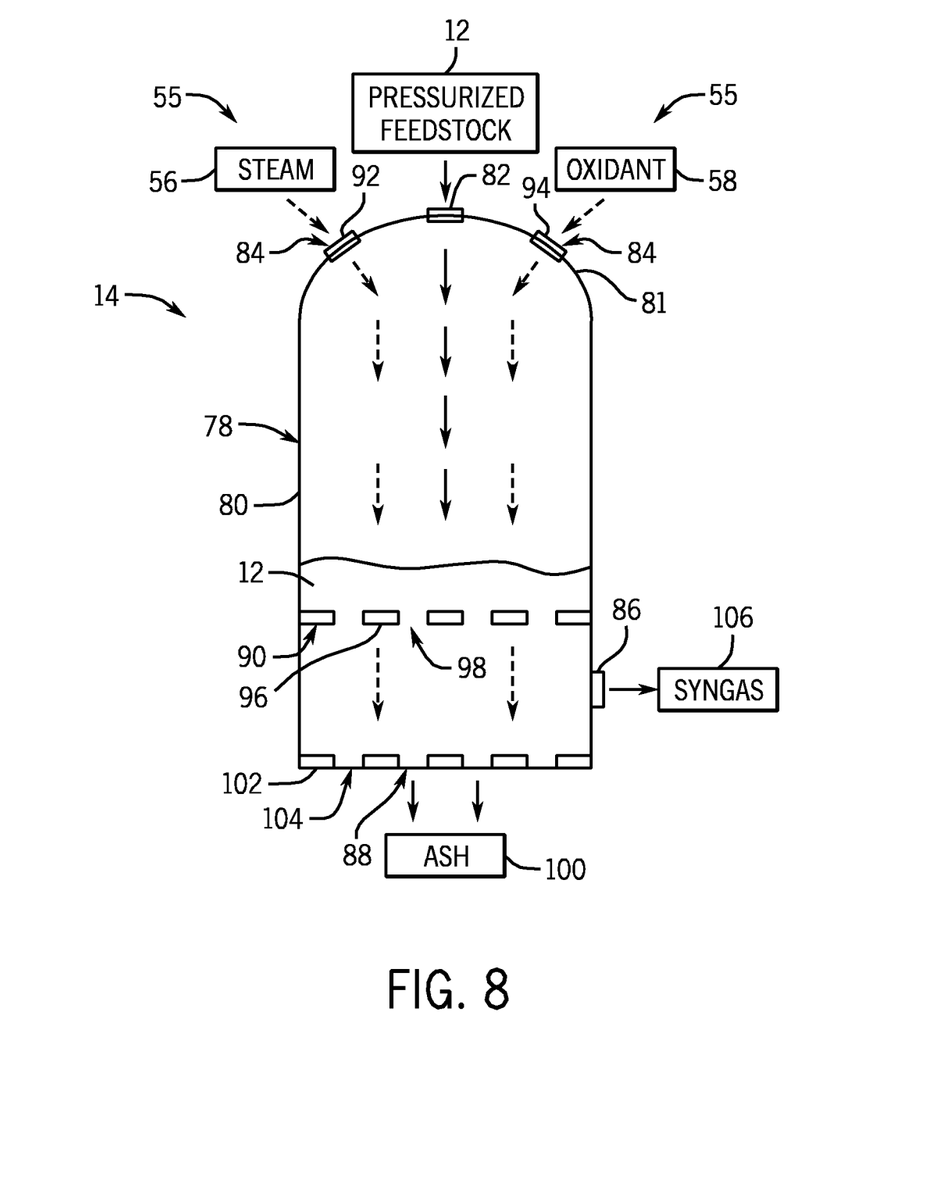
FIG. 8 is a cross-sectional schematic view of an embodiment of a co-current fixed bed reactor.
Figure 9:
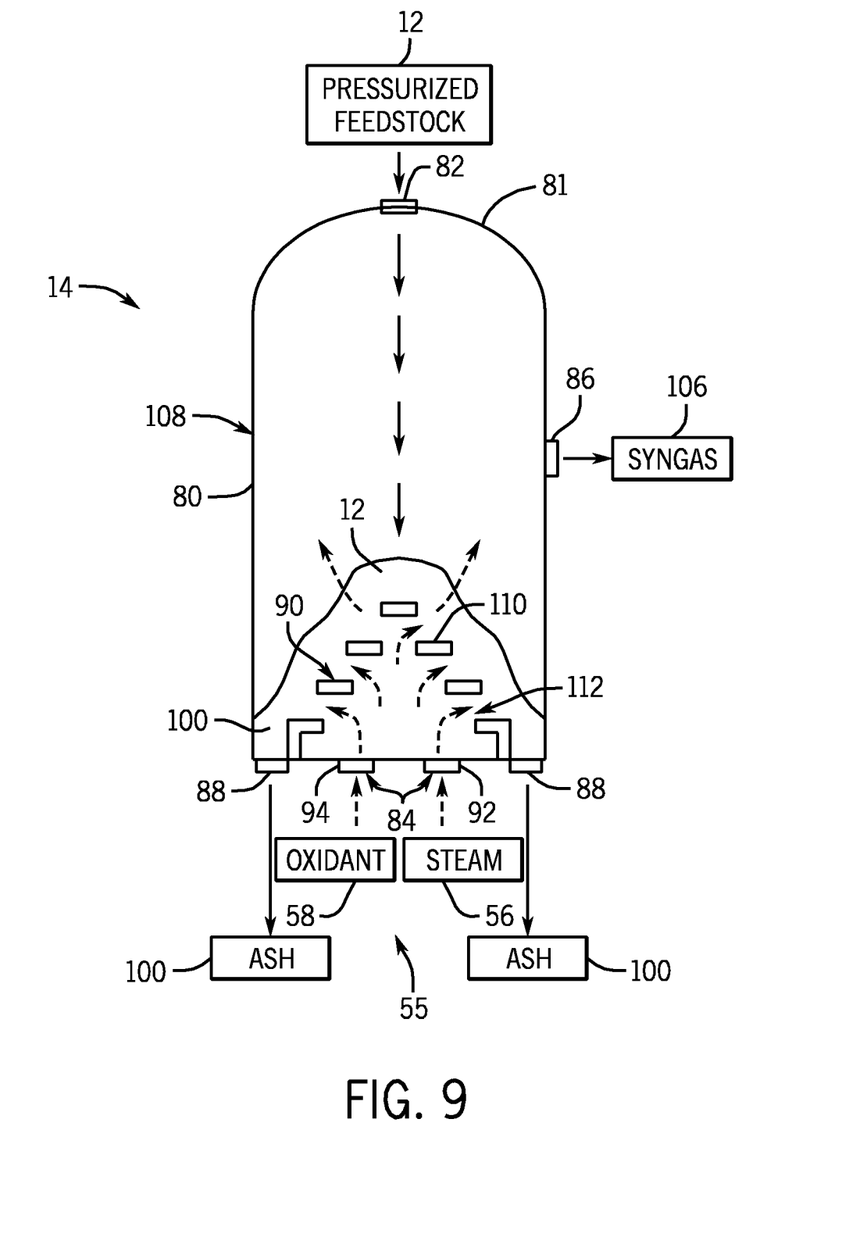
FIG. 9 is a cross-sectional schematic view of an embodiment of a counter-current fixed bed reactor.

The fixed bed reactors 14 used with the pressurized feedstock 12 may vary in design. FIGS. 8 and 9 illustrate embodiments of a fixed bed reactor 14. For example, FIG. 8 is a cross-sectional schematic view of an embodiment of a co-current fixed bed reactor 78. In some embodiments, the co-current fixed bed reactor 78 may be a co-current fixed bed gasifier 78. The fixed bed reactor 78 includes an enclosure 80, a feedstock inlet 82, agent inlets 84, an outlet 86, an ash outlet 88, and a fixed bed 90. The enclosure 80 may have a hollow annular shape (e.g., cylindrical wall) with an upper dome 81. The feedstock inlet 82 is configured to receive the pressurized feedstock 12 at or near the upper dome 81 of the enclosure 80. At least one agent inlet 84 is configured to receive at least one agent 55 (e.g., a gasification agent 55). For example, at least one agent inlet 84 may include a steam inlet 92 for steam 56. Also, at least one agent inlet 84 may include an oxidant inlet 94 for oxidant 58 (e.g., air, enriched air, or oxygen). As illustrated, the agent inlets 84 are located at the upper dome 81 of the enclosure 80. In other embodiments, the agent inlets 84 may be located on a side of the enclosure 80 above the fixed bed 90.

The fixed bed 90 is configured to support the pressurized feedstock 12 while allowing flow of at least one of the agents or gasification agents 55 (e.g., steam 56, air or oxygen) downward through the pressurized feedstock 12. The fixed bed 90 may include a grate 96 with openings 98. The gasification of the pressurized feedstock 12 occurs as described above. Upon initiation of gasification, steam 56 and/or oxidant 58 flow through the pressurized feedstock 12 resting on the fixed bed 90. Ash 100 is generated from the gasification reaction. The ash 100 falls through the openings 98 of the grate 96 down to the ash outlet 88. The ash outlet 88 is configured to output the ash 100. The ash outlet 86 may include another grate 102 that includes openings 104 that allows the ash 100 to fall through the openings 104 in the grate 102. The outlet 86 may be a syngas outlet 86. The syngas outlet 86 is configured to output syngas 106. After gasification of the pressurized feedstock 12, the syngas 106 flows through the openings of grate 98 and exits via the syngas outlet 86. Thus, in the co-current fixed bed gasifier 78 the pressurized feedstock 12 and syngas 106 flow in the same general direction (e.g., downwards in this case).

Alternatively, FIG. 9 is a cross-sectional schematic view of an embodiment of a counter-current fixed bed reactor 108. In some embodiments, the counter-current fixed bed reactor 108 may be a counter-current fixed bed gasifier 108. The fixed bed reactor 108 includes enclosure 80, feedstock inlet 82, agent inlets 84, outlet 86, ash outlets 88, and fixed bed 90. The enclosure 80 may have a hollow annular shape (e.g., cylindrical wall) with an upper dome 81. The feedstock inlet 82 is configured to receive the pressurized feedstock 12 at or near the upper dome 81 of the enclosure 80. At least one agent inlet 84 is configured to receive at least one agent 55 (e.g., a gasification agent 55). For example, at least one agent inlet 84 may include steam inlet 92 for steam 56. Also, at least one agent inlet 84 may include oxidant inlet 94 for oxidant 58 (air, enriched air, or oxygen). As illustrated the agent inlets 84 are located at a bottom of the enclosure 80.

The fixed bed 90 is configured to support the pressurized feedstock 12 while allowing flow of at least one of the agents or gasification agents 55 (e.g., steam 56, air, or oxygen) upward through the pressurized feedstock 12. The fixed bed 90 may include a stepped structure 110 with openings 112. The gasification of the pressurized feedstock 12 occurs as described above. Upon initiation of gasification, steam 56 or oxidant 58 flow upwards through the pressurized feedstock 12 resting on the fixed bed 90. Ash 100 is generated from the gasification reaction. The ash 100 drifts down the stepped structure 110 to the ash outlets 88. The ash outlets 88 are configured to output the ash 100. The outlet 86 is a syngas outlet 86 configured to output syngas 106. As illustrated, the syngas outlet 86 is located on the side of the enclosure 80 above the fixed bed 90. In certain embodiments, the syngas outlet 86 may be located at or near the upper dome 81 of the enclosure 80. After gasification of the pressurized feedstock 12, the syngas 106 flows generally upward and exits via the syngas outlet 86. Thus, in the counter-current fixed bed gasifier 108, the pressurized feedstock 12 and syngas 106 flow in generally opposite directions (e.g., the feedstock 12 flows downward and the agents 55 and syngas 106 flow upward). In both embodiments of the fixed bed reactors 78 and 108, the pressurized feedstock 12 from the posimetric pump(s) elevates the pressure of the fixed bed reactors 78 and 108 to increase the production capacity of the fixed bed reactors 78 and 108, rather than operating at near atmospheric conditions.

Technical effects of the disclosed embodiments include providing a posimetric pump 18 to pressurize and meter pressurized feedstock 12 (e.g., biomass) to fixed bed reactors 14 to elevate the pressure in the reactors 14 to increase the production capacity of the normally small scale fixed bed reactors 14. The heater 20 or heat exchanger 48 further enables control of the moisture content of the feedstock 12 to improve the performance of the feedstock 12 as a fuel. Multiple feedstocks 12 may be transferred to the fixed bed reactor 14 with features, such as multiple conveyors 16, multiple posimetric pumps 18, and/or mixer 46, in a controlled manner to adjust the heating value and the moisture content of the mixture of feedstock 14 to be controlled. Further, controllers 24 may be used to receive feedback 28 and to control the heating and/or mixing of the feedstock 12. Overall, these features improve the production capacity of the fixed bed reactors 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a posimetric pump configured to increase pressure of a feedstock to provide a pressurized feedstock, wherein the posimetric pump comprises:
an inlet;
an outlet;
a curved passage disposed between the inlet and outlet;
a first region at atmospheric or low pressure disposed adjacent the inlet; and
a second region at higher pressure relative to the first region disposed adjacent the outlet, wherein the feedstock is pressurized as it travels along the curved passage from the first region to the second region;
a fixed bed gasifier configured to gasify the pressurized feedstock, wherein the fixed bed gasifier comprises an enclosure, a feedstock inlet configured to receive the pressurized feedstock, at least one agent inlet configured to receive at least one gasification agent, a syngas outlet configured to output a syngas, an ash outlet configured to output ash, and a fixed bed configured to support the pressurized feedstock while allowing flow of the at least one gasification agent through the pressurized feedstock;
first and second feedstock conveyors configured to deliver first and second feedstocks as the feedstock to the posimetric pump;
at least one transducer disposed in the posimetric pump or the fixed bed gasifier; and
a controller programmed to vary a ratio of the first feedstock relative to the second feedstock into the posimetric pump to adjust a moisture content or a heating value of mixed feedstock in the posimetric pump based on feedback received from the at least one transducer, wherein the feedback comprises the heating value of the mixed feedstock, a temperature, a pressure, an indicator of performance of the fixed bed gasifier, or a measurement of the moisture content of the mixed feedstock in the fixed bed gasifier.

2. The system of claim 1, wherein the posimetric pump is configured to increase the pressure of biomass to provide pressurized biomass, and the fixed bed gasifier is configured to gasify the pressurized biomass.

3. The system of claim 1, wherein the posimetric pump is configured to meter the pressurized feedstock to the fixed bed gasifier.

4. The system of claim 1, comprising a feeder configured to meter the pressurized feedstock from the posimetric pump to the fixed bed gasifier.

5. The system of claim 1, comprising a heater configured to heat the feedstock or the pressurized feedstock upstream from the fixed bed gasifier.

6. The system of claim 5, wherein the controller is coupled to the heater, and the controller is programmed to adjust heat output of the heater to adjust the moisture content of the feedstock or the pressurized feedstock based on the feedback received from the at least one transducer.

7. The system of claim 1, wherein the at least one agent inlet comprises an oxidant inlet.

8. The system of claim 7, wherein the at least one agent inlet comprises a steam inlet.

9. The system of claim 1, wherein the enclosure comprises an upper dome, and the feedstock inlet is located at the upper dome to receive the pressurized feedstock.

10. A system, comprising:
a posimetric pump configured to increase pressure of a feedstock, wherein the posimetric pump comprises:
an inlet;
an outlet;
a curved passage disposed between the inlet and outlet;
a first region at atmospheric or low pressure disposed adjacent the inlet;
and
a second region at higher pressure relative to the first region disposed adjacent the outlet, wherein the feedstock is pressurized as it travels along the curved passage from the first region to the second region;
a feeder configured to meter the feedstock from the posimetric pump;
a fixed bed reactor configured to react at least one agent with the feedstock from the feeder at an elevated pressure provided by the posimetric pump, wherein the fixed bed reactor comprises a fixed bed configured to support the feedstock while allowing flow of the at least one agent through the feedstock;
first and second feedstock conveyors configured to deliver first and second feedstocks as the feedstock to the posimetric pump;
at least one transducer disposed in the posimetric pump, the feeder, or the fixed bed reactor; and
a controller programmed to vary a ratio of the first feedstock relative to the second feedstock into the posimetric pump to adjust a moisture content or a heating value of mixed feedstock in the posimetric pump based on feedback received from the at least one transducer, wherein the feedback comprises the heating value of the mixed feedstock, a temperature, a pressure, an indicator of performance of the fixed bed reactor, or a measurement of the moisture content of the mixed feedstock in the fixed bed reactor.

11. The system of claim 10, wherein the posimetric pump is configured to increase the pressure of biomass, the feeder is configured to meter the biomass from the posimetric pump, and the fixed bed reactor is configured to react the at least one agent with the biomass from the feeder.

12. The system of claim 10, wherein the fixed bed reactor comprises a fixed bed gasifier, a fixed bed boiler, or a fixed bed combustion system.

13. The system of claim 10, wherein the feeder comprises a screw feeder, a rotary feeder, or a combination thereof.

14. The system of claim 10, wherein the fixed bed reactor comprises an enclosure having an upper dome, and a feedstock inlet located at the upper dome to receive the feedstock.

15. A system, comprising:
a posimetric pump configured to increase pressure of a feedstock, wherein the posimetric pump comprises:
an inlet;
an outlet;
a curved passage disposed between the inlet and outlet;
a first region at atmospheric or low pressure disposed adjacent the inlet;
and
a second region at higher pressure relative to the first region disposed adjacent the outlet, wherein the feedstock is pressurized as it travels along the curved passage from the first region to the second region;
a heater configured to heat the feedstock to control a moisture content of the feedstock;
a controller coupled to the heater;
a fixed bed reactor configured to react at least one agent with the feedstock at an elevated pressure provided by the posimetric pump, wherein the fixed bed reactor comprises a fixed bed configured to support the feedstock while allowing flow of the at least one agent through the feedstock;
first and second feedstock conveyors configured to deliver first and second feedstocks as the feedstock to the posimetric pump; and
at least one transducer disposed in the posimetric pump or the fixed bed reactor, wherein the controller is programmed to control the heater or posimetric pump based on feedback received from the at least one transducer, and the controller is configured to vary a ratio of the first feedstock relative to the second feedstock into the posimetric pump to adjust a moisture content or a heating value of mixed feedstock in the posimetric pump based on the feedback received from the at least one transducer, wherein the feedback comprises the heating value of the mixed feedstock, a temperature, a pressure, an indicator of performance of the fixed bed reactor, or a measurement of the moisture content of the mixed feedstock in the fixed bed reactor.

16. The system of claim 15, wherein the controller is programmed to adjust heat output of the heater to adjust the moisture content of the feedstock in response to the feedback.

17. The system of claim 15, wherein the posimetric pump is configured to increase the pressure of biomass, and the fixed bed reactor is configured to react the at least one agent with the biomass.

18. The system of claim 17, wherein the fixed bed reactor comprises a fixed bed gasifier, a fixed bed boiler, or a fixed bed combustion system.

19. The system of claim 15, wherein the fixed bed reactor comprises an enclosure having an upper dome, and a feedstock inlet located at the upper dome to receive the feedstock.

20. A system, comprising:
a first and second posimetric pump each configured to increase pressure of a feedstock to provide a pressurized feedstock, wherein both the first and second posimetric pump each comprises:
an inlet;
an outlet;
a curved passage disposed between the inlet and outlet;
a first region at atmospheric or low pressure disposed adjacent the inlet;
and
a second region at higher pressure relative to the first region disposed adjacent the outlet, wherein the feedstock is pressurized as it travels along the curved passage from the first region to the second region;
a fixed bed gasifier configured to gasify the pressurized feedstock, wherein the fixed bed gasifier comprises an enclosure, a feedstock inlet configured to receive the pressurized feedstock, at least one agent inlet configured to receive at least one gasification agent, a syngas outlet configured to output a syngas, an ash outlet configured to output ash, and a fixed bed configured to support the pressurized feedstock while allowing flow of the at least one gasification agent through the pressurized feedstock; and
wherein the first posimetric pump is configured to increase pressure of a first feedstock to provide a first pressurized feedstock to the fixed bed gasifier, the second posimetric pump is configured to increase pressure of a second feedstock to provide a second pressurized feedstock to the fixed bed gasifier, wherein the system comprises at least one transducer disposed in the first posimetric pump, the second posimetric pump, or the fixed bed gasifier, wherein the system comprises a controller programmed to vary a ratio of the first pressurized feedstock relative to the second pressurized feedstock into the fixed bed gasifier to adjust a moisture content or a heating value of mixed feedstock in the fixed bed gasifier based on feedback received from the at least one transducer, wherein the feedback comprises the heating value of the mixed feedstock, a temperature, a pressure, an indicator of performance of the fixed bed gasifier, or a measurement of the moisture content of the mixed feedstock in the fixed bed gasifier.

* * * * *